United States Patent Office 3,488,276
Patented Jan. 6, 1970

3,488,276
REMOVAL OF SALTS BY ELECTRODIALYSIS
Alexander R. Tarsey, Tarzana, Calif., assignor to North American Aviation, Inc.
Filed Aug. 15, 1966, Ser. No. 572,561
Int. Cl. B01d *13/02;* B01k *3/00*
U.S. Cl. 204—301      4 Claims

ABSTRACT OF THE DISCLOSURE

A series of discrete, sealed packages containing electrolyte which may be inserted into an electrodialysis chamber so that they may be removed and replaced individually if damaged.

---

This invention relates to electrodialysis. This invention further relates to the purification or concentration of ion solutions by electrodialysis.

The use of electrodialysis to purify or concentrate ionic solutions is known in the art. Typically this purification or concentration is done by means of a battery of electrodialysis cells. A single cell comprises, in order: a volume containing an anode, a membrane permeable to anions, an inner volume, a member permeable to cations, and a volume containing a cathode. It can be seen that the volume containing the cathode would tend to have a concentration of cations. The volume containing the anode would tend to have a concentration of anions. The inner volume would tend to have neither anions nor cations, i.e., become deionized. A series of these cells is constructed of a series of alternating cation and anion permeable membranes. The series is terminated by an anode and a cathode. This series or battery of cells would, in alternate cells, produce purified water and water in which ions are concentrated.

One of the most common uses for batteries of these cells is in the purification of salty water. In the purification of salty water, economical operation is essential to a successful process. It is therefore necessary that the batteries be efficient and not waste power.

In batteries revealed in the prior art, complex ducting and manifolding is provided so that water fed into the purifying cells is kept separate from the water fed into the concentrating cells. This complex ducting leads to a high pressure drop across the battery, and consequent high pumping cost.

Typically, a prior art battery consists of alternating layers of spacers and fragile membranes held together by a physical frame much like a filter press. These prior art batteries are delicate and tedious to assemble. Moreover, the tearing of one membrane mixes the diluent and concentrate streams, rendering the entire battery inefficient. The battery must then be torn down, and repaired and assembled.

It is an object of this invention to provide an efficient electrodialysis cell that is inexpensive to use.

It is a further object of this invention to provide an effective electrodialysis battery that is efficient, easy to repair, and easy to maintain.

It is a further object of this invention to provide a system for the continuous purification or concentration of ion solutions.

Other objects and many attendant advantages are accomplished by the present invention.

The present invention comprises a sealed package. The package comprises a virtually waterproof cation permeable membrane side, a virtually waterproof anion permeable membrane side, and means for separating the membrane sides. The membrane sides, separated by a spacer, define an inner volume that is filled with electrolyte.

The present invention further comprises a water purification apparatus comprising a container with an anode, a cathode, and a leaf-like array of the packages described above. The packages are disposed in the container such that the side of the package having the membrane permeable to positive ions is faced toward the positive potential. As will be later explained, this arrangement causes ions from the electrolyte surrounding the package to concentrate in the package. Another embodiment of the invention involves an apparatus using the described packages that continuously deionizes water. This continuous apparatus is characterized by two processing compartments, alternately deionizing water and deionizing packages. The alternation of function is performed by means of reversing the polarity of the field impressed on the containers.

The invention may be better understood by referring to the figures in which.

Figure 2:
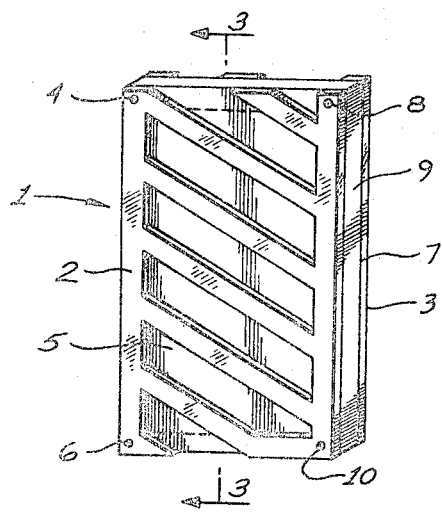
FIG. 2 is a perspective view of the electrolytic cell of the invention in its sealed form.
Figure 3:
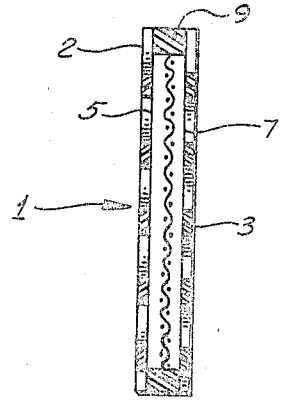

FIG. 3, taken along lines 3—3 of FIG. 2, is a cross-sectional view of the sealed package.

Figure 4:
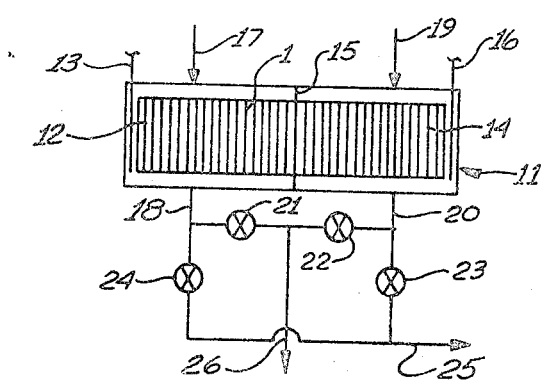

FIG. 4 is a schematic diagram of a continuous purifying device embodying the electrodialysis packages of the instant invention.

Figure 1:
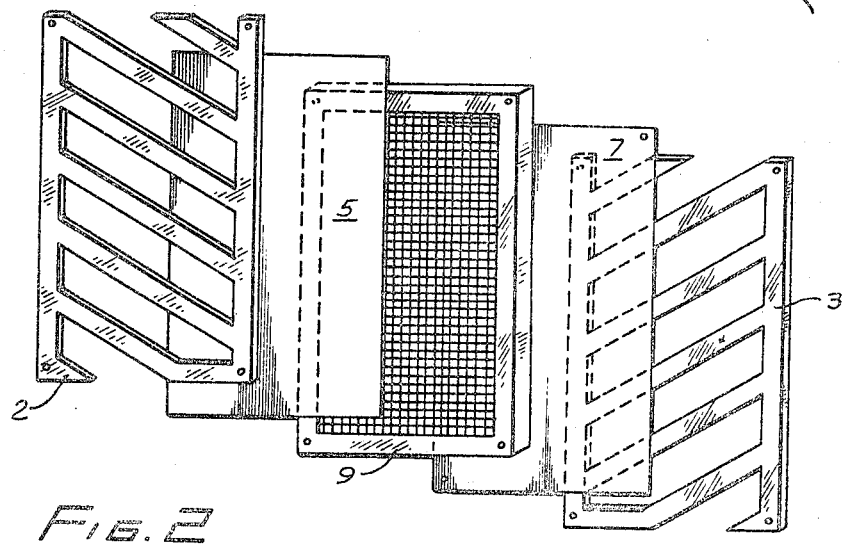
FIG. 1 is an exploded view of the electrolytic package of the invention.

Referring to FIG. 1, an exploded view of the package 1 shows two perforated protective gaskets 2 and 3. These gaskets are preferably used to protect fragile membranes from abuse. Membranes possessing good strength properties would not require these protective gaskets. Between these gaskets are disposed two ion selective membranes 5 and 7. One of the membranes is permeable to anions; the other is permeable to cations. As is understood in the art, an anion permeable membrane is selective to cations, and vice versa. Between the two membranes, a perforated spacer 9 is disposed.

FIG. 2 shows a perspective view of the assembled package 1. The supporting perforated gasket 2 is shown on the outside face. An ion selective virtually water-tight membrane 5 can be seen through the perforations of the gasket 2. The gaskets 2 and 3 are held to the face of the membranes 5 and 7 by non-conductive bolts 4, 6, 8, and 10.

Referring to FIG. 3, the assembled package 1 is shown in cross section. The gaskets 2 and 3 support and protect the membranes 5 and 7. They are mechanically held adjacent to the membranes by non-conductive bolts 4, 6, 8, and 10. The membranes 5 and 7 are virtually watertight. The membranes are separated by, and sealed to, a spacer 9. This separation defines an enclosed volume filled with water.

The design of an individual package 11 can vary greatly within the scope of the invention. It may be of any geometrical configuration, although rectangular is preferred. Similarly, the area may vary greatly from a few square inches to several square feet. The conversion rate of a package would of course be a function of its area.

The supporting perforated gaskets 2 and 3 may be made of any suitable non-conductive structural material that is not adversely affected by the electrolyte. Examples of suitable materials would be Teflon, polyethylene, neoprene, polystyrene and commercial asbestos sheet packing. The gaskets have the same shape as the package. A balance should be struck between perforations in the gasket large enough to maximize the membrane area presented to the electrolyte, and perforations small enough to maintain the structural integrity of the gasket. The perforations should preferably be of such design that liquid can readily flow between two packages that are touching one another.

The membranes 5 and 7 can be constructed of material known in the art, and are available commercially. Cation permeable membranes can be, for instance, sheets of polystyrene matrix to which sulfonic acid groups are chemically attached. Anion permeable membranes can be, for instance, sheets of polystyrene matrix to which quaternary ammonium groups are chemically attached.

The membranes are preferably sealed to a spacer such as 9 in FIG. 1 to form a virtually water-tight compartment. Within the framework of this invention, "virtually water-tight" means that virtually no water flows into or out of the package. This sealing may be by means of an adhesive. If desired, however, the membranes may be held to the spacer by the protective gaskets, and the entire package held together by mechanical means as seen in FIG. 3. The spacer design may vary within the scope of the invention. It should be a structural member, yet it should be perforated, to allow the diffusion of ions.

As indicated, it is not necessary that the gaskets 2 and 3 be sealed to the membranes 5 and 7. It is preferred that the gaskets be mechanically attached to the other parts of the package. A separable mechanical attachment, as the non-conductive bolts described in FIG. 2 would allow more ready repair of a package, should a membrane tear. It is recognized that other considerations might lead to the choice of a completely sealed package. In such a package, the gaskets would be sealed to the exterior side of the membrane. Such an embodiment is also within the scope of the invention. The only critical characteristic of the design is that the finished package be of such a configuration that the membranes and spacer define an essentially water-tight volume.

FIGURE 4 shows a continuous processing system 11 embodying the packages 1 of the instant invention. A battery of the packages of the instant invention allows greater production and higher efficiency than the use of a single package. The system 11 comprises a purifying chamber 12 and a concentrating chamber 14. The chambers are separated by a semi-permeable non-selective wall 15. That is, a wall through which either cations or anions can pass, but gross flows of water are stopped. Examples would be porous clay, or sheets of paper. In the purifying chamber 12, the packages 1 are closely arrayed in a leaf fashion such that the membrane in each package that is permeable to cations is faced toward the anode 13. In this manner, anions migrating toward the anode are stopped inside the package by the cation permeable membrane. Similarly, the anion permeable membrane of each package, facing the cathode, stops cations that are migrating from the package towards the cathode. It can be seen that, in the case of salt inclusions in water, $Na^+$ and $Cl^-$ ions will tend to concentrate in the packages, thereby purifying the water about the packages. Water entering the chamber 12 through conduit 17, then, is purified by the packages 1, and passes out through conduit 18.

In the chamber 14 nearest the cathode 16, the packages 1 are faced such that the membrane permeable to cations is faced towards the cathode. That is, the packages are in a mirror-image position of the packages in the chamber 12 nearest the anode. Water entering the chamber 14 from the conduit 19, then, picks up ions from the packages. The water in the packages becomes rejuvenated, giving up a sufficient quantity of its previously collected ions, such that it is reusable to again process salty water. The water used to remove ions from the packages in the chamber 14 leaves the chamber through the conduit 20, ordinarily to waste.

It can be seen that if valves 21 and 23 are closed and valves 22 and 24 are open, fresh water will leave the apparatus 11 through conduit 25, via conduit 18. Water used to deionize the packages 1 in the compartment 14 would leave the apparatus through the conduit 26, via the conduit 20.

After a period of operation, the packages 1 in the compartment 12 will contain water with a high concentration of ions. The packages 1 in the compartment 14 will be significantly deionized. At this point, valves 22 and 24 may be closed, valves 21 and 23 opened, and the polarity of the electrodes reversed. It can be seen that this would cause the chamber 14 to become the purifying chamber, and chamber 12 to become the chamber whose packages are to be purified. Conduit 25 will still carry fresh water, but the water will now come from chamber 14 via conduit 20. Conduit 26 will still carry water with a relatively high content of ions, but it will now be coming from chamber 12 via conduit 18.

After a suitable period of operation, the polarity of the electrodes may once again be reversed, valves 22 and 24 opened, and valves 21 and 23 closed. This causes the system to return to the state initially described. This valving and reversing of polarity thereby yields an essentially continuous stream of fresh water from conduit 25.

If the total surface area of the membranes of the packages in the purifying chamber 12 is identical to that of the membranes in the chamber to be purified 14, the packages in chamber 12 will pick up ions at the same rate that the packages in chamber 14 lose ions. Thus, there should be no build up of ions in either chamber over a cycle. This, coupled with the continuous stream of purified water, renders the system suitable for continuous operation.

It is, of course, clear that a series of the packages of the invention may be arrayed in a container such that they all either deionize water or are being deionized. Such a batch apparatus might be preferred to a continuous apparatus in some applications. For example, it would be more readily portable than a continuous apparatus with its attendant valves and conduits.

The preferred embodiment of a system is to have the flow of water normal to the leaf array of the cells. The number of cells in the battery is not critical, and may be several hundred. The conversion capacity of a battery is a direct function of the number of packages in it. It should be noted that if a membrane of a package in a purifying battery should rupture, the ions in that package would mix with the purified water of the battery. However, once the ions are removed from the opened package, the battery would return to normal operation. This operation would be as effective as before rupture, less the processing capability of one package. This may be contrasted with a prior art parallel flow battery, wherein the rupture of a membrance can interfere markedly with the operation of an entire battery. Further, a damaged package of the apparatus of the instant invention may be replaced without disturbing the other packages, or their operation. Should a membrane fail while its package is being deionized, there will be no interruption of the flow of fresh water.

The use of reversible electrodes in the apparatus of the invention is preferred. That is, electrodes that are capable of acting either as cathodes or anodes. An example would be the silver-silver chloride electrode. In this embodiment of the invention, a container of silver chloride would act as the cathode, and a container of silver as the anode. In operation, the anode would be partially converted to silver chloride, and the cathode to silver. Upon reversing the polarity of the electrodes, as mentioned above, the silver chloride-laden anode would become the cathode, and be converted back to silver. Similarly, the silver-laden cathode would become the anode, and be converted back to silver chloride. The net change in free energy of the electrodes across a cycle is therefore zero. The reversible electrodes are especially useful in a continuous system.

The effectiveness of the packages of the invention may be demonstrated with a single battery.

The demonstration battery could comprise a container fashioned of plexiglass. The container is provided with a double bottom. The upper bottom is drilled at random with several hundred small holes. The lower bottom is water-tight.

At the inside front of the container, an electrode is fastened. It is made of silver. It is pretreated by immersion in dilute HCl, where it is oxidized anodically with direct current. Plastic clamps hold the electrode in place. They also prevent the packages of the invention from approaching the electrode too closely.

A second electrode is fastened similarly to the inside rear of the container. It differs only in that it is pretreated with fewer coulombs of direct current.

The volume between these electrodes is occupied by the packages of the invention. Each package comprises, in order, an external gasket, a membrane selective to anions, an internal spacer, a membrane selective to cations and another external gasket. The internal spacers are made from solid plates of non-conducting plastic. The plates are perforated by a large number of holes so that nothing remains but a frame all around the edge of the plate and a web. The membranes are cut into squares while wet. The external gaskets are also squares. The gaskets are also made of plastic. They are perforated by long diagonal slots extending near the edge, leaving only a frame and narrow diagonal ribs.

Each entire package is taped together around the edge after first allowing the membranes to soak in brine. While still wet, each package is sewn together around the edges with a heavy nylon thread, both to help hold each package together and to prevent the packages from packing to close when stacked in the container. Care should be taken that the ribs at the front and back of each package would not be parallel.

The air inside each package is then replaced with brine by means of a syringe. The packages are then placed into the container in a close leaf array with the anion permeable membranes facing the front electrode. Care is taken to see that ribs on adjacent external gaskets of adjacent packages are not parallel.

In a closed loop system, brine containing sodium chloride may then be passed through the container. The brine is preferably introduced between the two bottoms. As brine overflows, it is collected and returned to the feed storage vessel for recycling.

A direct current is impressed across the cell from a constant current source, the front electrode serving as the cathode and the rear electrode as the anode.

At the end of several hours the salt content of the circulating line is reduced to a level such that the water is palatable.

The processed water may then be removed and additional brine containing sodium chloride circulated through the cell, with the polarity of the electrodes reversed. This brine would become more salty. At the same amperage, it would take as long to desalt the packages as was previously taken to desalt the brine. The packages would then be prepared to process more brine into palatable water.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A virtually waterproof electrodialysis package containing electrolyte and comprising:
    (a) a generally planar waterproof cation permeable membrane
    (b) a waterproof anion permeable membrane arranged substantially parallel to said cation permeable membrane
    (c) spacer means abutting said membranes for separating said membranes and to define together with said membranes a closed volume for electrolyte
    (d) a pair of perforated non-conductive gaskets generally coextensive with said membranes and in contact with the sides of said membranes opposite said separating means and
    (e) means securing said membranes, said separating means and said gaskets into a unitary package.
2. A water purifying apparatus comprising:
    (a) a container
    (b) means for inducing a positive potential at one end of the container
    (c) means for inducing a negative potential at the opposite end of the container
    (d) a leaf array of virtually waterproof electrodialysis packages containing electrolyte and comprising:
        (1) a generally planar waterproof cation permeable membrane
        (2) a waterproof anion permeable membrane arranged substantially parallel to said cation permeable membrane
        (3) spacer means abutting said membranes for separating said membranes and to define together with said membrane a closed volume for electrolyte
        (4) a pair of perforated non-conductive gaskets generally coextensive with said membranes and in contact with the sides of said membranes opposite said separating means and
        (5) means securing said membranes, said separating means and said gaskets into a unitary package,
    said unitary packages disposed such that the anion permeable membrane of each package faces the means for inducing a positive potential.
3. The apparatus of claim 2 where the means for inducing electrical potentials is reversible electrodes.
4. A continuous water purifying apparatus comprising:
    (a) a container divided into two compartments by a semipermeable non-selective wall,
    (b) means disposed in a first compartment for inducing a positive potential at one end of the container,
    (c) means disposed in a second compartment for inducing a negative electrical potential at the opposite end of the container
    (d) a leaf array of virtually waterproof electrodialysis packages disposed in the first compartment containing electrolyte and comprising:
        (1) a waterproof cation permeable membrane side
        (2) a waterproof anion permeable membrane side
        (3) means for separating said membrane sides
    said packages disposed in the first compartment such that the like membrane side of each package is faced towards the means that is in the compartment for inducing electrical potential;
    (e) a leaf array of virtually waterproof electrodialysis packages disposed in the second compartment containing electrolyte and comprising:
        (1) a waterproof cation permeable membrane side
        (2) a waterproof anion permeable membrane side
        (3) means for separating said membrane sides
    said packages disposed in the second compartment such that the like membrane side of each package is faced towards the means that is in the compartment for inducing electrical potential such that when the packages in the first compartment have the cation permeable membrane side facing the electrode, the packages of the second compartment have their cation permeable membrane side facing the electrode and when the first compartment's packages have the anion permeable membrane side facing the electrode, the second compartment's packages have their anion permeable membrane side facing the electrode;
    (f) means for introducing water to be processed into said compartments
    (g) means for removing processed water from said compartments

(h) means for reversing the polarity of the potential at both ends of the container.

References Cited

UNITED STATES PATENTS

| | | | | |
|---|---|---|---|---|
| 2,970,098 | 1/1961 | Ellis | | 204—301 |
| 3,214,362 | 10/1965 | Juda | | 204—255 |
| 3,219,567 | 11/1965 | Lacey | | 204—180 |

JOHN H. MACK, Primary Examiner

A. C. PRESCOTT, Assistant Examiner

U.S. Cl. X.R.

204—180